April 25, 1939.  M. G. HINNEKENS  2,156,089
CHUCK
Filed May 26, 1937
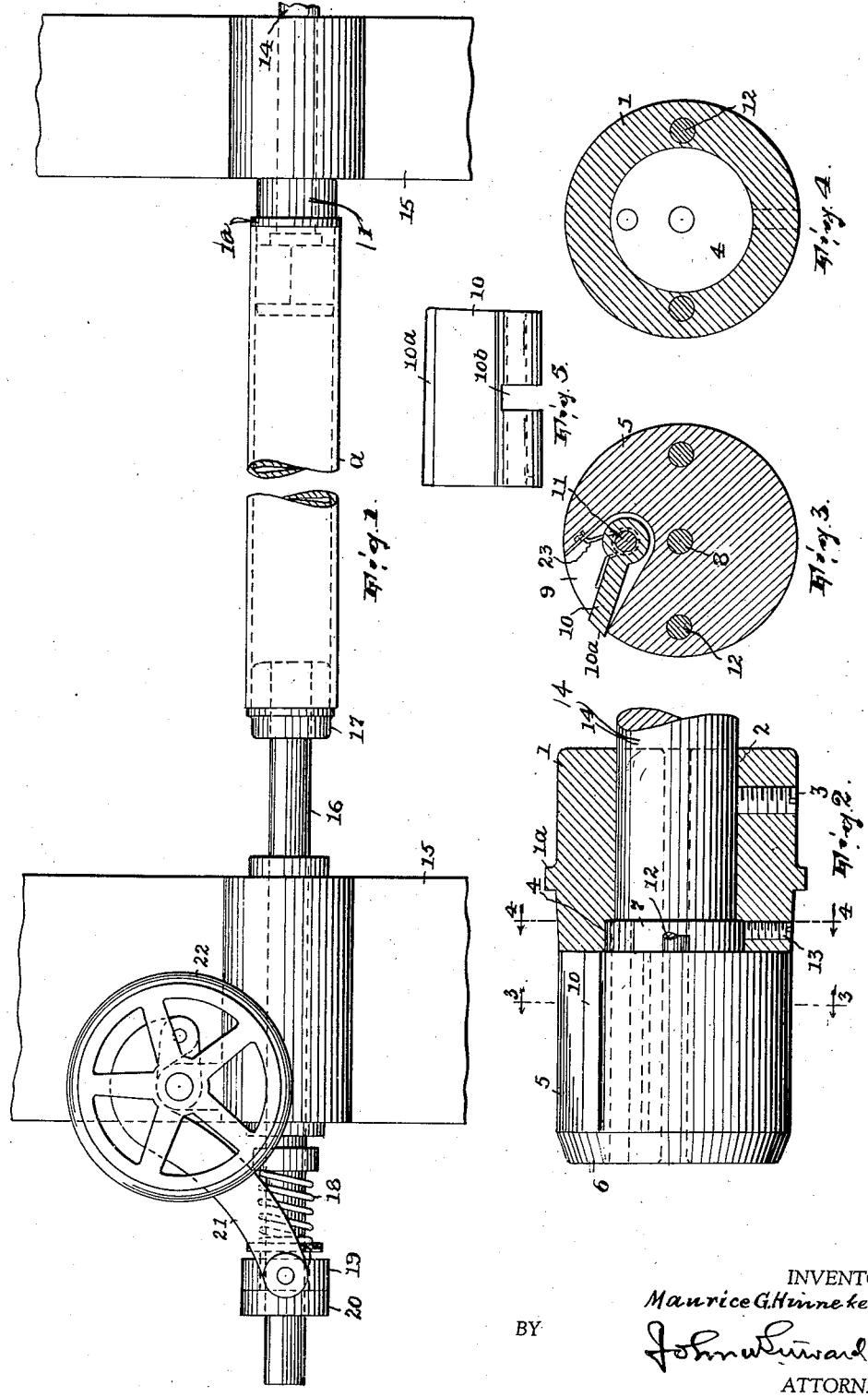
INVENTOR,
Maurice G. Hinnekens,
BY
John W. Sinnard.
ATTORNEY.

Patented Apr. 25, 1939

2,156,089

UNITED STATES PATENT OFFICE 2,156,089

CHUCK

Maurice G. Hinnekens, Paterson, N. J.

Application May 26, 1937, Serial No. 144,868

2 Claims. (Cl. 242—68)

This invention relates to apparatus for winding cloth and other sheet material on a tubular roll of paper or the like formed with its interior more or less yielding. Ordinarily the roll is supported and driven by having its ends fitted over two rotary chucks, one a dead chuck and the other a live or driving chuck, suitably driven, which has a tapered portion to enter wedge-fashion into the roll and is serrated so that the teeth formed dig into the roll. The teeth or serrations, after repeated applications of the roll to the live chuck, soon damage it so that the chuck no longer obtains a good driving connection with the roll.

According to this invention a chuck is provided whose action on the roll is appreciably less destructive. Further, the chuck is so constructed that it may be manufactured at the minimum of cost. To these ends it comprises a supporting member, which is affixed to the shaft, and a roll-gripping member axially related and affixed to the supporting member. The roll-gripping member has a slot open at its periphery and within which is pivoted a dog free to move, counter to the direction in which the chuck rotates for winding, so as to project from the slot and so grip the end of the roll fitted over said roll-gripping member. The chuck is formed as two axially related members so that the slot may be readily formed, as by machining it out, so as to extend from the end of the member which is to adjoin the supporting member, and if, as is preferred, the roll-gripping member has its other end portion a separately formed part, what I term the body, having such slot, may be machined out from end to end to form the slot, which on the assembling of the parts will be closed at one end by the supporting member and at the other by said part. The two members may be secured together by pins penetrating them and having riveted ends and to reinforce the connection thus formed between them they may in effect be doweled together as by securing to the end of the roll-gripping member which adjoins the supporting member a disk to fit snugly a recess in the latter member. The construction is such as not to be expensive to produce and there is the advantage that when the beveled end of the dog requires to be re-sharpened the parts may be readily disassembled.
In the drawing, Fig. 1 shows in front elevation a winding assembly including the improved driving or live chuck;

Fig. 2 shows such chuck partly in elevation and partly in longitudinal section;

Figs. 3 and 4 are sections on lines 3—3 and 4—4, respectively, of Fig. 2; and

Fig. 5 is a plan of the dog 10.

The supporting member is here in effect a collar 1 in whose bore 2 the live or driving shaft (to be referred to) is received, the member having a set-screw 3 to abut the shaft and secure said member thereto and the member in this example having in one end and coaxial therewith a recess 4. This member has near its recessed end a peripheral stop or flange 1a and from the flange to said end it may be slightly tapered, as shown.

The roll-gripping member in this example includes a cylindrical body 5, a disk 6 coaxial with and abutting one end of and of about the same diameter as the body but preferably beveled, as shown, and another disk 7 of appreciably less diameter than and abutting the other end of the body, and means to secure these three parts together, being here an axial pin 8 penetrating all three and having its ends upset or riveted; the diameter of disk 7 equals that of recess 4 in the supporting member. The body 5 has a longitudinal slot 9 open from the disk 6 to the other end of the body, and the roll-gripping member also includes a pawl or dog 10 which is pivoted in this slot on an axis parallel with the axis of the chuck, to wit, on a pin 11 traversing the slot and supported at its ends, which may be upset or riveted, in the two disks; the dog is opposed on the one hand by disk 6 and on the other (here) by both member 1 and the disk 7. This dog has a beveled end 10a which at least when the dog is turned on its pivot clockwise in Fig. 3 projects from the slot; it preferably projects even in its retracted or illustrated position.

The two members may be secured together against relative rotation with the disk 7 of one (which forms a terminal boss thereon) snugly fitting the recess 4 of the other (thus forming a kind of dowel connection) by two or more equally spaced pins 12 penetrating them outwardly of disk 7 and in parallel relation to the chuck axis and having their ends upset or riveted. There is a set-screw 13 tapped into member 1 and abutting the disk 7. This set-screw prevents disk 7 from rotating independently, under influence of the dog, to a position in which the pivot pin 11 would be skewed out of parallelism to the axis of the chuck.

The parts of the chuck being assembled as shown in Fig. 2 the member 1 is secured on a live shaft 14 journaled in the frame 15 and which may be rotated by any suitable driving means. Journaled in the frame opposite the chuck is another shaft 16 equipped with a dead chuck, as a flanged collar 17 fixed thereon and having a slight taper to fit the end of the roll a. The rotary support formed by this shaft and its chuck is movable toward and from the other or live chuck, being normally held retracted by a spring 18 interposed between the frame and a collar 19 free on the shaft but in turn abutting a fixed collar 20, collar 19 being connected by a bent link 21 with an eccentric point of a wheel 22, whereby when the wheel is turned to the position shown said rotary support will be locked in its new position and so coact with the live chuck to support the roll. When the shaft 14 carrying my chuck is driven (anti-clockwise in Fig. 3) tension means active on the cloth being wound tends to turn the roll clockwise on the chuck, wherefore the dog is impressed in the inner surface of the roll and the chuck thus obtains its grip thereon.

In order to remove the roll from the chuck, after withdrawing the other or dead chuck from the roll, the roll is turned in the direction (anti-clockwise in Fig. 3) relatively to the chuck to move the dog toward the position of Fig. 3, or its retracted position. Frequently when this has been done the dog fails to clear the roll sufficiently to permit its removal due to its edge remaining caught in the dent it has formed in the interior of the roll. To insure its clearing the roll I provide a spring 23 here coiled about the pin 11 and having one end bearing against the dog and the other against a side of the recess formed by slot 9; Fig. 5 shows the dog formed with a recess at 10b to receive the coil of the spring.

Having thus fully described my invention what I claim is:

1. In a chuck, the combination, with a unitary structure including a cylindrical body having an exteriorly peripherally open slot extending from end to end of the body, a supporting member closing one end of the slot and having an axial bore closed at one end by said body and open at the other end and adapted to receive the end of a driving shaft, and a disk coaxial with the body and closing the other end of the slot, and means arranged eccentrically of the bore and common to and rigidly securing said body, disk and member together, of a dog arranged in the slot and pivoted in such structure eccentrically of the body and formed to project from the slot when turned in one direction.

2. The combination set forth in claim 1 characterized by said member and body respectively having a socket and a terminal boss snugly fitting the socket and such socket and boss coaxial with the body.

MAURICE G. HINNEKENS.